United States Patent [19]

Lehmann et al.

[11] Patent Number: 5,849,887
[45] Date of Patent: Dec. 15, 1998

[54] MIXTURES OF REACTIVE DYES AND THEIR USE

[75] Inventors: Urs Lehmann, Basel, Switzerland; Rolf Deitz, Grenzach-Wyhlen; Hans Reichert, Rheinfelden, both of Germany; Athanassios Tzikas, Pratteln, Switzerland

[73] Assignee: Ciba Specialty Chemicals Corporation, Tarrytown, N.Y.

[21] Appl. No.: 50,280

[22] Filed: Mar. 30, 1998

[30] Foreign Application Priority Data

Apr. 7, 1997 [CH] Switzerland .............. 0806/97

[51] Int. Cl.⁶ .............. C09B 62/475; C09B 67/22; D06P 1/38
[52] U.S. Cl. .............. 534/642; 534/643; 8/549
[58] Field of Search ............ 534/642, 643; 8/549

[56] References Cited

U.S. PATENT DOCUMENTS

| | | | |
|---|---|---|---|
| 5,445,654 | 8/1995 | Hussong et al. .............. | 8/546 |
| 5,565,553 | 10/1996 | Deitz et al. .............. | 534/612 |
| 5,611,821 | 3/1997 | Huang et al. .............. | 8/549 |

FOREIGN PATENT DOCUMENTS

| | | |
|---|---|---|
| 735112 | 10/1996 | European Pat. Off. . |
| 785237 | 7/1997 | European Pat. Off. . |
| 2032927 | 1/1972 | Germany . |
| 1349168 | 3/1974 | United Kingdom . |

OTHER PUBLICATIONS

Chem. Abst. 125:303252z (1996).
Derwent Abst. 96–018304/02 and English Translation for KR9402560, Mar. 25, 1994.

*Primary Examiner*—Fiona T. Powers
*Attorney, Agent, or Firm*—David R. Crichton

[57] ABSTRACT

Dye mixtures comprising at least one reactive dye of formula

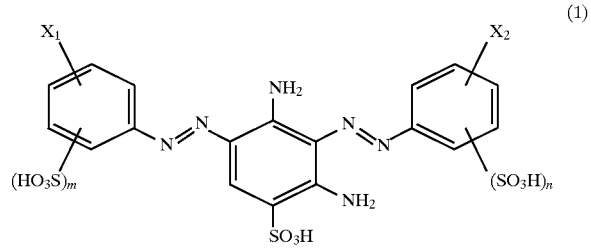

together with at least one reactive dye of formula

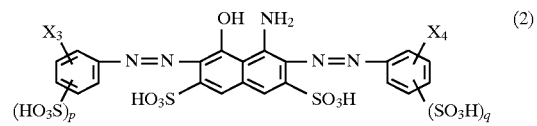

give dyeings having good fastness properties on nitrogen-containing or hydroxyl group-containing fiber materials.

16 Claims, No Drawings

MIXTURES OF REACTIVE DYES AND THEIR USE

MIXTURES OF REACTIVE DYES AND THEIR USE

The present invention relates to mixtures of reactive dyes which are particularly suitable for dyeing or printing nitrogen-containing or hydroxyl group-containing fibre materials, giving dyeings or prints having good allround fastness properties.

Accordingly, this invention relates to dye mixtures, which comprise at least one reactive dye of formula

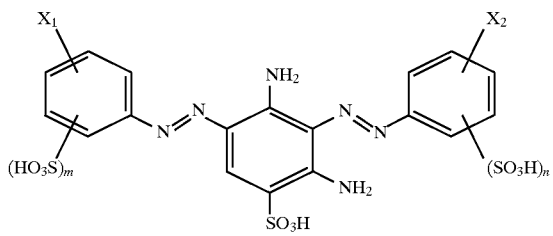
(1)

together with at least one reactive dye of formula

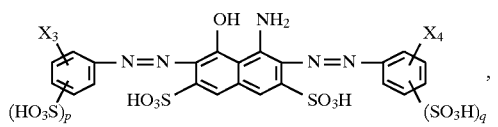
(2)

wherein m and n are each independently of the other the number 0, 1 or 2, p and q are each independently of the other the number 0 or 1, and $X_1$, $X_2$, $X_3$ and $X_4$ are each independently of one another a radical of formula

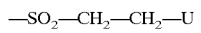 (3a),

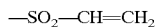 (3b),

 (3c) or

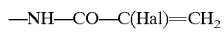 (3d),

U is a leaving group, and Hal is halogen, with the proviso that the dye mixtures do not contain any substantial amount of a reactive dye of formula

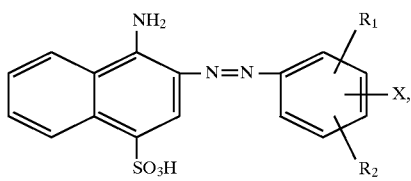
(4)

wherein $R_1$ and $R_2$ are hydrogen, methyl or methoxy, and X is a radical of the above formula (3a) or (3b), or, if the dye mixtures contain a reactive dye of formula

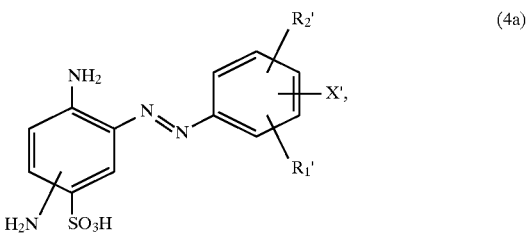
(4a)

wherein $R_1'$ and $R_2'$ are hydrogen, methyl or methoxy and X' is a radical of the above formula (3a) or (3b), the weight ratio of the dye of formula (1) to the dye of formula (4a) is greater than 2:1.

The leaving group U is suitably, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$—C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, more preferably —Cl or —OSO$_3$H and, particularly preferably, —OSO$_3$H.

Hal is preferably chloro or bromo. Bromo is most preferred.

m and n are preferably each independently of the other the number 0 or 1. The sum of m and n is particularly preferably the number 0 or 1. m and n are very particularly preferably the number 0.

p and q are preferably the number 0.

$X_1$ and $X_2$ are preferably each independently of the other a radical of formula (3a) or (3c). Particularly preferably, at least one of the radicals $X_1$ and $X_2$ is a radical of formula (3a). $X_1$ and $X_2$ are very particularly preferably a radical of formula (3a). U is in this case preferably the radical —OSO$_3$H. The sum of m and n is here preferably the number 0 or 1. m and n are most preferably the number 0.

$X_3$ and $X_4$ are preferably each independently of the other a radical of formula (3a) or (3c). $X_3$ and $X_4$ are particularly preferably a radical of formula (3a). U is in this case preferably the radical —OSO$_3$H, and p and q are here preferably the number 0.

Preferred dye mixtures are those, wherein $X_1$, $X_2$, $X_3$ and $X_4$ are a radical of formula (3a) or (3c), U is the radical —OSO$_3$H, and the sum of m and n is the number 0 or 1. Hal is in this case preferably bromo.

Preferred reactive dyes of formula (1) are those of formulae

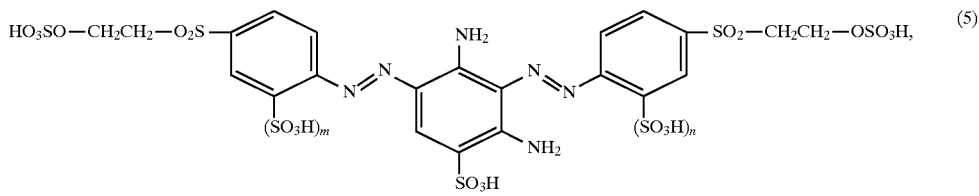
(5)

-continued

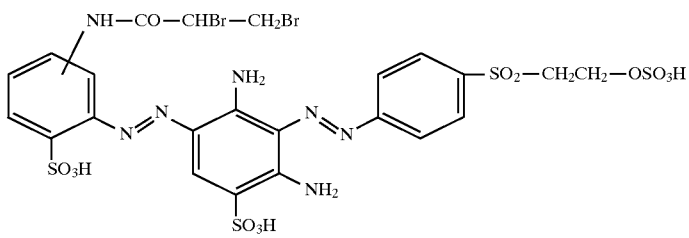

(6)

and

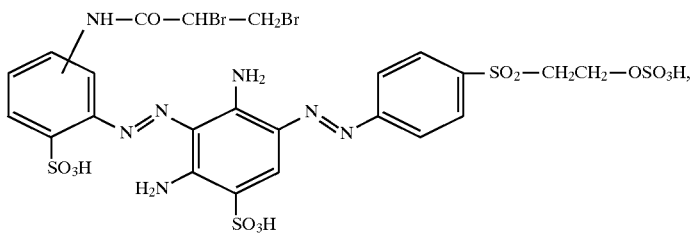

(7)

in particular those of formula (5) or (6) and, more preferably, those of formula (5). m and n have the meanings and preferred meanings stated above. The sum of m and n is preferably the number 0 or 1.

Preferred reactive dyes of formula (2) are those of formulae

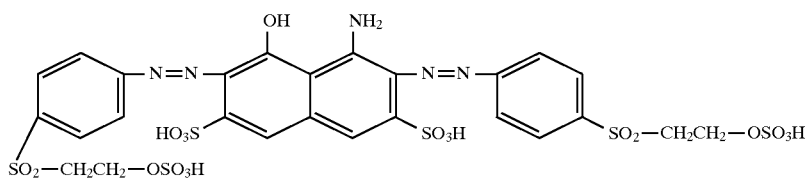

(8)

and

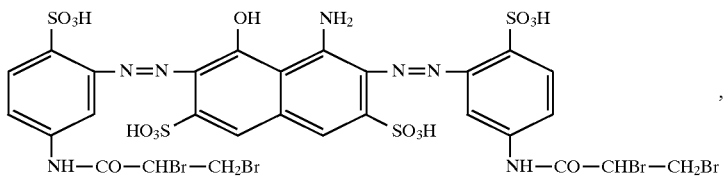

(9)

in particular those of formula (8).

Particularly preferred dye mixtures are those which comprise at least one reactive dye of formulae (5), (6) and (7) together with at least one reactive dye of formulae (8) and (9). The sum of m and n is here preferably the number 0 or 1. m and n are most preferably the number 0.

Very particularly preferred dye mixtures are those which comprise at least one reactive dye of formula (5) together with at least one reactive dye of formula (8). The sum of m and n is here preferably the number 0 or 1. m and n are preferably the number 0.

Interesting dye mixtures are also those which comprise at least one reactive dye of formula (6) or (7), in particular of formula (6), together with at least one reactive dye of formula (8).

In addition to the above reactive dyes, the novel dye mixtures can comprise other dyes, in particular other reactive dyes for shading.

Substantial amounts of reactive dyes of formula (4) will be understood, for example, as being amounts of more than 5% by weight, based on the total weight of the dye mixture.

The novel dye mixtures preferably do not contain any substantial amounts of reactive dyes of formula (4), particularly preferably the dye mixtures do not contain a reactive dye of formula (4).

The weight ratio of the dye of formula (1) to the dye of formula (4a) is preferably greater than 3:1, more preferably the weight ratio is greater than 4:1, and particularly preferably the weight ratio is greater than 6:1. Preferably the weight ratio is greater than 10:1, more preferably the weight ratio is greater than 20:1, and particularly preferably the weight ratio is greater than 40:1.

This invention also relates to reactive dyes of formula

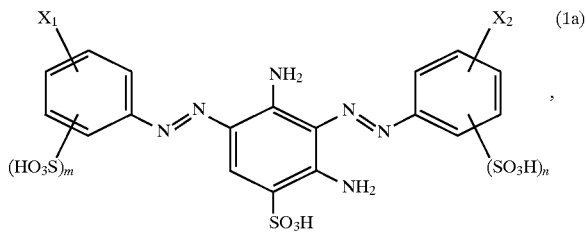

(1a)

wherein m, n, $X_1$ and $X_2$ have the meanings given above for formula (1), and one of the radicals $X_1$ and $X_2$ is a radical of formula (3a), (3b), (3c) or (3d) and the other one of the radicals $X_1$ and $X_2$ is a radical of formula (3c) or (3d). In this connection, m, n, $X_1$ and $X_2$ have the preferred meanings given above. The reactive dyes of formula (1a) have the preferred meanings given above for the reactive dyes of formula (1).

In another of its aspects, this invention relates to a process for the preparation of the reactive dyes of formula (1a), which comprises diazotising compounds of formulae

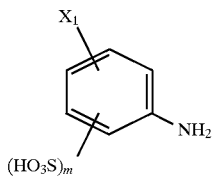

(10a)

and

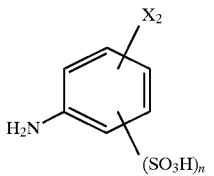

(10b)

and coupling the diazonium compound so obtained in any order to a coupling component of formula

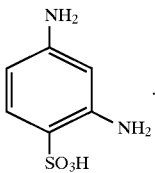

(11)

The diazotisation can be carried out in a manner known per se, for example with sodium nitrite in an aqueous hydrochloric medium. The coupling can also be carried out by known processes, for example at a temperature in the range from 0° to 30° C. and at a pH from e.g. 3 to 6.

The reactive dyes of formula (2) are known or can be obtained in general analogy to known processes. Reactive dyes of formula (1) can be obtained in general analogy to the instructions for the preparation of the reactive dyes of formula (1a).

The reactive dyes of formulae (1), (2) and (1a) comprise sulfo groups which are obtained either in the form of the free sulfonic acid or, preferably, as the salt thereof, for example as the sodium, lithium, potassium or ammonium salt, or as salt of an organic amine, e.g. as tri-ethanol ammonium salt. The reactive dyes of formulae (1), (2) and (1a), and therefore also the dye mixtures, can comprise further additives, for example sodium chloride or dextrin.

The dyes of formulae (1) and (2) are present in the dye mixture at a weight ratio of typically 1:99 to 99:1, preferably of 5:95 to 95:5 and, particularly preferably, of 10:90 to 90:10.

The dye mixtures of this invention can be prepared, for example, by mixing the individual dyes. This mixing process is carried out, for example, in suitable mills, e.g. in ball mills or pin mills and also in kneaders or mixers.

Another object of this invention is a process for dyeing or printing natural or synthetic polyamide fibre materials, which comprises using a dye mixture comprising at least one reactive dye of formula

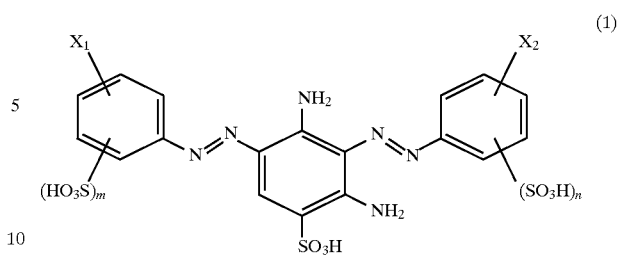

(1)

together with at least one reactive dye of formula

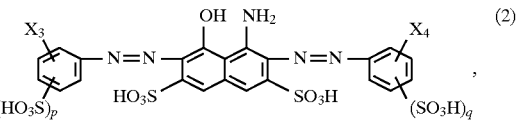

(2)

wherein m and n are each independently of the other the number 0, 1 or 2, p and q are each independently of the other the number 0 or 1, and $X_1$, $X_2$, $X_3$ and $X_4$ are each independently of one another a radical of —$SO_2$—$CH_2$—$CH_2$—U (3a), —$SO_2$—CH=$CH_2$ (3b), —NH—CO—CH(Hal)—$CH_2$Hal (3c) or —NH—CO—C(Hal)=$CH_2$ (3d), U is a leaving group, and Hal is halogen.

This invention also relates to a process for dyeing or printing hydroxyl group-containing or nitrogen-containing fibre materials with the novel dye mixtures or with the novel reactive dyes of formula (1a).

Suitable fibre materials are, for example, natural cellulosic fibres, such as cotton, linen, jute or hemp, as well as modified cellulosic fibres, such as cellulose or regenerated cellulose. The novel dye mixtures or dyes are particularly suitable for dyeing or printing natural polyamide fibre materials, for example silk or wool, synthetic polyamide fibre materials, e.g. polyamide 6 or polyamide 6.6, or blends of wool and synthetic polyamide. The novel dye mixtures or dyes are particularly suitable for dyeing or printing natural polyamide fibre materials, especially wool or wool which has been chlorinated or finished to be machine-washable.

The cited textile fibre material can be in a very wide range of forms of presentations, for example in the form of fibre, yarn, loose stock, wovens or knits.

The novel dye mixtures or dyes are suitable for the customary dyeing and printing processes and may be applied and fixed to the fibre material in different manners, preferably in the form of aqueous dye solutions and printing pastes. The novel reactive dyes are suitable both for the exhaust process and for dyeing by the pad-dyeing process, in which the goods are impregnated with aqueous dye solutions which may contain salt, and the dyes are fixed after treatment with alkali, or in the presence of alkali, with or without the application of heat. The novel dye mixtures or dyes are also suitable for the so-called cold pad-batch method, which comprises applying the dye together with the alkali on the pad and subsequently fixing the dye by storing for severaly hours at room temperature. The dyeing of natural and synthetic polyamide fibre materials, in particular of wool, is preferably carried out by the exhaust process at a pH of about 3 to 7, preferably of 3 to 5, and in the temperature range from e.g. 70° to 120° C. and, preferably, from 90° to 105° C.

In addition to water and the dyes of formulae (1) and (2) or of formula (1a), the dye liquors or printing pastes can contain further auxiliaries, for example per se known shading dyes, salts, buffer substances, wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

The dye mixtures or dyes of this invention give level dyeings and prints having good allround fastness properties, in particular good fastness to washing, rubbing, wet treatment, wet rubbing and light. The novel dye mixtures or dyes are also distinguished by uniform colour buildup, good affinity and high degrees of fixation. When using the dye mixtures or dyes of this invention, the customary aftertreatment of the dyeings and prints with so-called fixing agents may furthermore be foregone.

In the following Examples, parts are parts by weight and temperatures are given in degrees Celsius. The relationship between parts by weight and parts by volume is the same as that between the gramme and the cubic centimetre.

WORKING EXAMPLE 1

A hydrochloric suspension consisting of 3.95 parts of 1,3-phenylenediamine-4-sulfonic acid in 25 parts of water is charged, with cooling with ice, with a suspension of 8.70 parts of diazotised 5-(2,3-dibromopropionamido)-aniline-2-sulfonic acid in 90 parts of water over 30 minutes. After 2 hours at 5° C., the temperature is raised to 15° C. and the reaction mixture is stirred for 15 hours at this temperature. After cooling to a temperature of 0° to 5° C., a cold hydrochloric suspension of 5.95 parts of diazotised 2-(4-aminophenylsulfonyl)-ethyl hydrogensulfate in 50 parts of water is added over 30 minutes. The pH is then adjusted to 4.5 with an aqueous 30 % sodium hydroxide solution. After coupling is complete, the dye is precipitated by addition of sodium chloride, isolated by filtration and dried, giving a dye which, in the form of the free acid, corresponds to the compound of formula

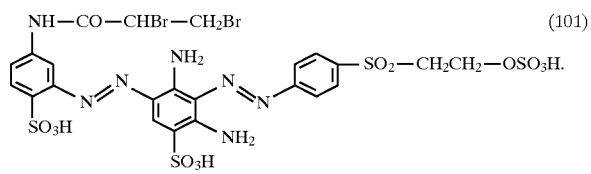
(101)

The dye of formula (101) dyes wool, synthetic polyamide or cotton in an orange shade.

Working Examples 2 to 8

In general analogy to the instructions for Working Example 1, it is possible to obtain the dyes listed in the following Table 1, column 2, in the form of the free acid. The dyes listed in Table 1 dye wool, synthetic polyamide or cotton in an orange shade.

TABLE 1

| Ex. | Dye | |
|---|---|---|
| 2 | [structure] | (102) |
| 3 | [structure] | (103) |
| 4 | [structure] | (104) |

TABLE 1-continued

| Ex. | Dye | |
|---|---|---|
| 5 | 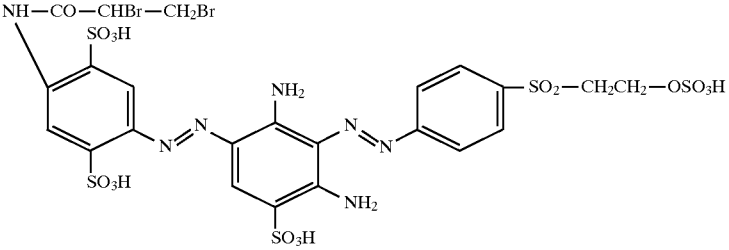 | (105) |
| 6 | 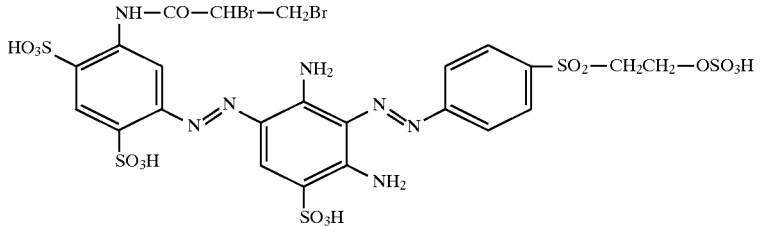 | (106) |
| 7 | 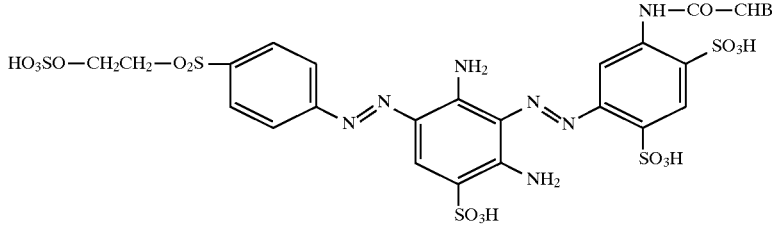 | (107) |
| 8 | 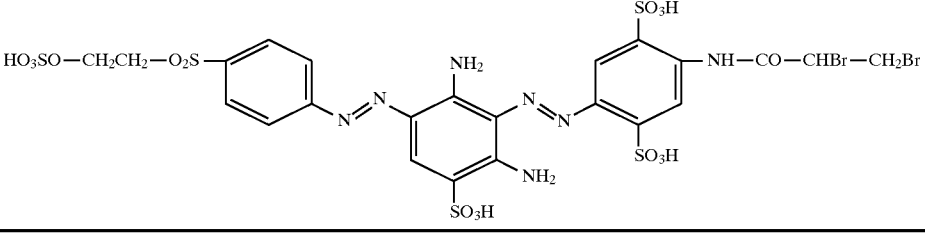 | (108) |

Working Example 9

A hydrochloric suspension consisting of 2.82 parts of 1,3-phenylene-diamine-4-sulfonic acid in 16 parts of water is charged, with cooling with ice, with 5.58 parts of diazotised 4-amino-3-sulfo-(2-sulfatoethyl)phenylsulfone in 36 parts of water over 1 hour at 0° to 5° C. After coupling is complete, 4.22 parts of diazotised 2-(4-aminophenylsulfonyl)ethyl hydrogensulfate in 35 parts of water are added over 1 hour at 0 to 5° C. With cooling with ice, the pH is slowly adjusted to 4.5 by adding about 6 parts of an aqueous 30% sodium hydroxide solution. The mixture is then stirred for about 1 hour at 0° to 5° C. The reaction mixture is then spray dried, giving a dye which, in the form of the free acid, corresponds to the compound of formula

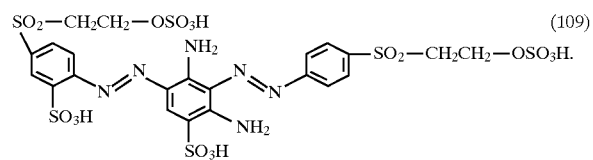

(109)

The dye of formula (109) dyes wool, synthetic polyamide or cotton in an orange shade.

In general analogy to the instructions of Working Example 9, it is possible to obtain the dye of formula

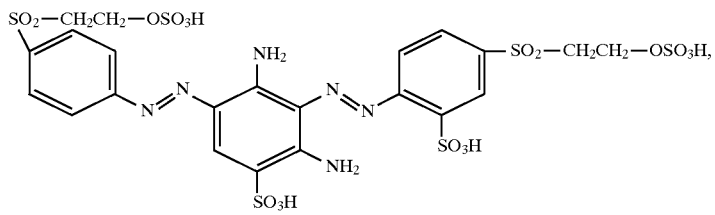

given in the form of the free acid, which dyes wool, synthetic polyamide or cotton in an orange shade.

Working Example 10

3.8 parts of 1,3-phenylenediamine-4-sulfonic acid are dissolved at 50° C. in 13 parts of water with addition of 2.8 parts of an aqueous 30% sodium hydroxide solution at pH 7. After addition of 20 parts of ice and 3 parts of sodium acetate, a cold hydrochloric suspension consisting of 12 parts of diazotised 2-(4-aminophenylsulfonyl)ethyl hydrogensulfate in 100 parts of water is added with vigorous stirring. The pH is kept at 4 with aqueous 30% sodium hydroxide solution and is raised to 4.5 after the addition of the diazo suspension is complete. After coupling is complete, the reaction mixture is spray dried, giving a dye which, in the form of the free acid, corresponds to the compound of formula

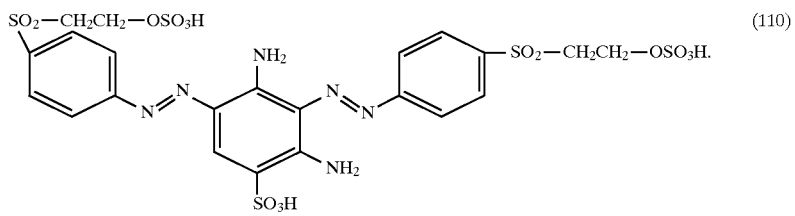

(110)

The dye of formula (110) dyes wool, synthetic polyamide or cotton in an orange shade.

Working Examples 11 to 22

In general analogy to the instructions for Working Example 10, it is possible to obtain the dyes listed in the following Table 2, column 2, in the form of the free acid. The dyes listed in Table 2 dye wool, synthetic polyamide or cotton in an orange shade.

TABLE 2

| Ex. | Dye | |
|---|---|---|
| 11 | [structure with NH—CO—CHBr—CH$_2$Br groups, NH$_2$, SO$_3$H substituents] | (111) |
| 12 | [structure with NH—CO—CHBr—CH$_2$Br groups, NH$_2$, SO$_3$H substituents] | (112) |

TABLE 2-continued
| Ex. | Dye | |
|---|---|---|
| 13 | 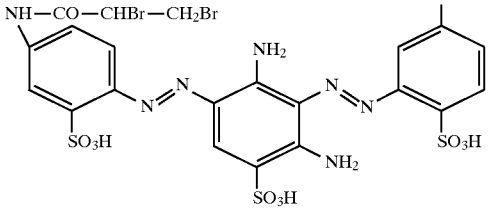 | (113) |
| 14 | 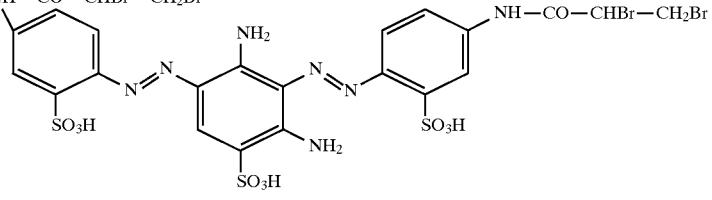 | (114) |
| 15 | 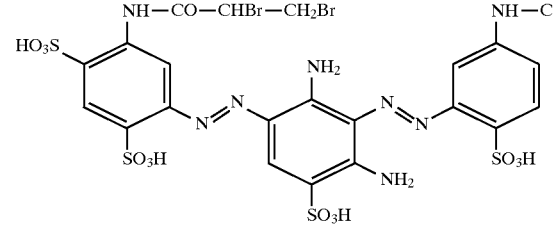 | (115) |
| 16 | 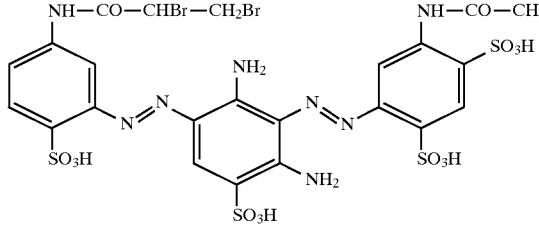 | (116) |
| 17 | 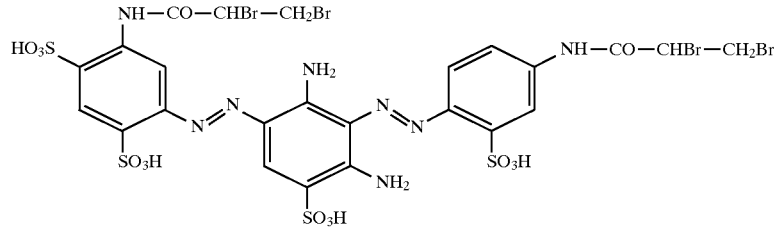 | (117) |
| 18 | 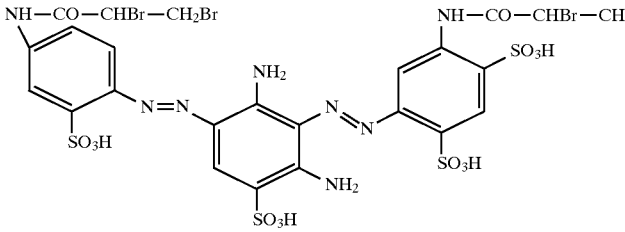 | (118) |

TABLE 2-continued

| Ex. | Dye | |
|---|---|---|
| 19 | [structure: central benzene with NH$_2$ (×2) and SO$_3$H substituents, linked via two N=N azo groups to two phenyl rings bearing NH—CO—CHBr—CH$_2$Br, SO$_3$H substituents] | (119) |
| 20 | [structure: central benzene with NH$_2$ (×2) and SO$_3$H substituents, linked via two N=N azo groups to two phenyl rings bearing NH—CO—CHBr—CH$_2$Br, SO$_3$H (and SO$_3$) substituents] | (120) |
| 21 | [structure: central benzene with NH$_2$ (×2) and SO$_3$H substituents, linked via two N=N azo groups to two phenyl rings bearing NH—CO—CHBr—CH$_2$Br, SO$_3$H substituents] | (121) |
| 22 | [structure: central benzene with NH$_2$ (×2) and SO$_3$H substituents, linked via two N=N azo groups to two phenyl rings bearing NH—CO—CHBr—CH$_2$Br, SO$_3$H substituents] | (122) |

Working Examples 23 to 32

In general analogy to the instructions for Working Example 10, it is possible to obtain the dyes listed in the following Table 3, column 2, in the form of the free acid. The dyes listed in Table 3 dye wool, synthetic polyamide or cotton in an orange shade.

TABLE 3

| Ex. | Dye |
|---|---|
| 23 | [structure: central benzene ring with NH$_2$ (×2) and SO$_3$H substituents, linked via two N=N azo groups to phenyl ring bearing NH—CO—CHBr—CH$_2$Br on one side and to phenyl ring bearing SO$_2$—CH$_2$CH$_2$—OSO$_3$H and SO$_3$H on the other side] |

TABLE 3-continued

| Ex. | Dye |
|---|---|
| 24 | (structure) |
| 25 | (structure) |
| 26 | (structure) |
| 27 | (structure) |
| 28 | (structure) |
| 29 | (structure) |

TABLE 3-continued

| Ex. | Dye |
|---|---|
| 30 | 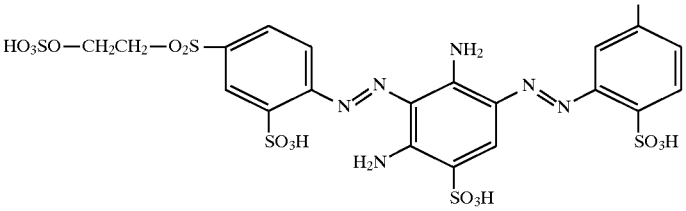 |
| 31 | 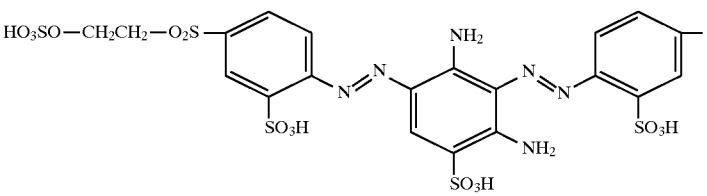 |
| 32 | 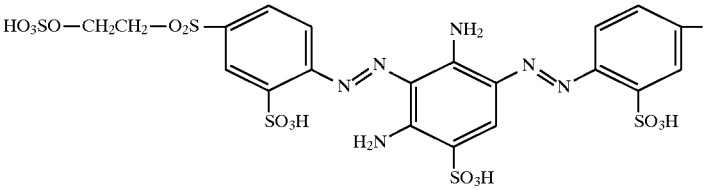 |

Dyeing Example 1

10 g of wool fabric are dyed in a laboratory dyeing apparatus using the following liquor:

0.2 g of sodium acetate,
0.5 g of 80% acetic acid,
0.2 g of a commercially available levelling agent (Albegal B®),
0.36 g of the blue dye of formula

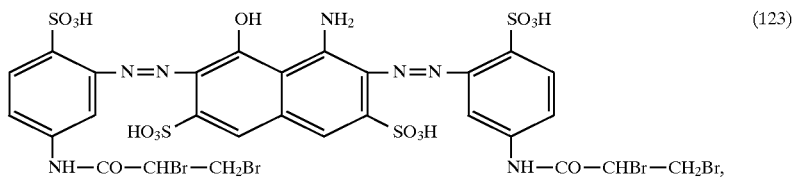
(123)

0.04 g of the orange dye of formula (101), and
200 ml of water.

The pH of the liquor is 4.5. The textile material is treated in the dye liquor for 5 min at 40° C. and is then heated at a heating rate of 1°/min to boiling temperature (98° C.) and dyed for 90 minutes at this temperature. The liquor is cooled to 80° C. and the dyeing is then rinsed and finished as usual. This gives a black fibre— and surface—level dyeing having good fastness properties.

Dyeing Examples 2 to 10

The procedure of Dyeing Example 1 is repeated, but replacing 0.36 g of the blue dye of formula (123) and 0.04 g of the orange dye of formula (101) with the dye mixtures or dyes listed in the following Table 4, column 2, in the amounts stated there, resulting in analogous fibre— and surface—level dyeings having good fastness properties. In the case of Dyeing Examples 2 to 8, black dyeings are obtained, and in the case of Dyeing Examples 9 and 10, orange dyeings are obtained.

TABLE 4

| Ex. | Dye mixture or dye |
|---|---|
| 2 | 0.36 g of the blue dye of formula (123), 0.04 g of the orange dye of formula (101), and 0.02 g of the red dye of formula |

TABLE 4-continued

| Ex. | Dye mixture or dye |
|---|---|

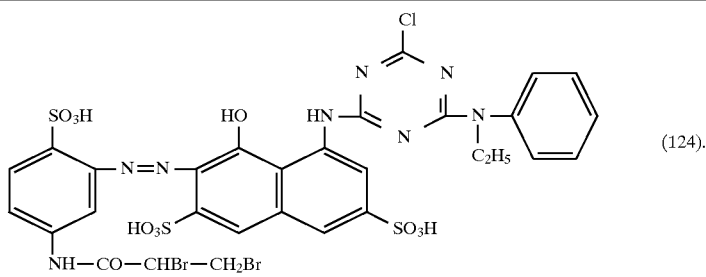

(124).

3   0.27 g of the blue dye of formula

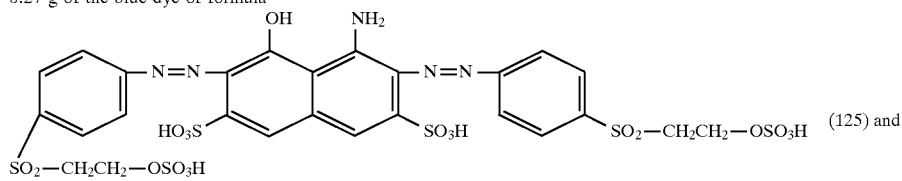

(125) and 0.026 g of the orange dye of formula (101).
4   0.27 g of the blue dye of formula (125), 0.026 g of the orange dye of formula (101), and 0.016 g of the red dye of formula (124).
5   0.27 g of the blue dye of formula (125), and 0.028 g of the orange dye of formula (110).
6   0.27 g of the blue dye of formula (125), 0.026 g of the orange dye of formula (110), and 0.017 g of the red dye of formula (124).
7   0.27 g of the blue dye of formula (125), and 0.026 g of the orange dye of formula (102).
8   0.27 g of the blue dye of formula (125), 0.026 g of the orange dye of formula (102), and 0.017 g of the red dye of formula (124).
9   0.083 g of the orange dye of formula (101).
10  0.081 g of the orange dye of formula (102).

Dyeing Example 11

10 g of a wool tricot finished by the hercoset process to superwash standard is dyed in a laboratory dyeing apparatus using the following liquor:
  0.2 g of sodium acetate
  0.5 g of 80% acetic acid
  0.5 g of Glauber salt
  0.2 g of a commercially available levelling agent (Albegal B®)
  0.36 g of the blue dye of formula (123),
  0.04 g of the orange dye of formula (101), and
  200 ml of water.

The pH of the liquor is 4.7. The textile material is treated in the dye liquor for 5 minutes at 40° C. and is then heated at a heating rate of 1°/min to 60° C. and kept for 20 minutes at this temperature. The liquor is then heated at 1°/min to boiling temperature (98° C.) and dyeing is carried out for 90 minutes at this temperature. The textile material is cooled and is then treated in a fresh liquor containing 5 g/l of sodium hydrogencarbonate for 20 minutes at 80° C. and at pH 8.3. The dyed material is then rinsed in customary manner, 1% of formic acid, based on the weight of the fibre material, being added to the last rinsing bath for acidification. A fibre— and surface—level black dyeing is obtained having good fastness properties.

In general analogy it is possible to replace the dye mixture consisting of 0.36 g of the blue dye of formula (123) and 0.04 g of the orange dye of formula (101) with a dye mixture according to one of the Dyeing Examples 2 to 8 or with a dye according to Dyeing Example 9 or 10.

Dyeing Example 12

10 g of loose wool are dyed in a laboratory dyeing apparatus using the following liquor:
  0.4 g of sodium acetate,
  1.0 g of 80% acetic acid,
  0.4 g of a commercially available levelling agent (Albegal B®),
  0.36 g of the blue dye of formula (123),
  0.04 g of the orange dye of formula (101), and
  800 ml of water.

The pH of the liquor is 4.7. The material is treated in the dyeing liquor for 5 minutes at 40° C. and is then heated at a heating rate of 1° C./min to boiling temperature (98° C.) and dyed for 90 minutes at this temperature. The liquor is cooled to 80° C. and the dyeing is then rinsed and finished as usual. A fibre— and surface—level black dyeing is obtained having good fastness properties.

In general analogy it is possible to replace the dye mixture consisting of 0.36 g of the blue dye of formula (123) and 0.04 g of the orange dye of formula (101) with a dye mixture according to one of the Dyeing Examples 2 to 8 or with a dye according to Dyeing Example 9 or 10.

Dyeing Example 13

1 kg of worsted spun yarn in the form of a cheese is pretreated in a circulation apparatus using a liquor consisting of
  9 l of water,
  9 g of ammonium acetate,
  37 ml of 80% acetic acid,
  9 g of a nonionic wetting agent (Albegal FFA®), and
  20 g of a commercially available levelling agent (Albegal B®),
for 10 minutes at 40° C. The pH of the liquor is 4.65.

After addition of a solution comprising 36 g of the blue dye of formula (123) and 4 g of the orange dye of formula (101), the goods are treated in the dye liquor for 5 minutes at 40° C. and are then heated at a heating rate of 1° C./min to 70° C. and kept for 15 minutes at this temperature. The liquor is then heated at 1°/min to boiling temperature (98° C.) and dyeing is carried out for 90 minutes at this temperature. After cooling the textile material, it is treated for 20 minutes at 80° C. in a fresh liquor which is adjusted to pH 8.5 with 35 g of 35% ammonia. The dyed material is then rinsed as usual, 1% of formic acid, based on the weight of the fibre material, being added to the last rinsing bath for acidification. A fibre— and surface—level black dyeing is obtained having good fastness properties.

Dyeing Example 14

The procedure of Dyeing Example 13 is repeated, but additionally adding to the dyeing liquor 4% by weight, based on the textile material, of a commercially available wool protecting agent (Irgasol HTW®), dyeing at 105° C. and shortening the dyeing time to 45 min, which also gives a fibre— and surface—level black dyeing having good fastness properties.

Dyeing Example 15

100 parts of a cotton fabric are placed in a dye bath at 60° C., which bath comprises 5.1 parts of the dye of formula (125), 0.9 part of the dye of formula (109) and 60 parts of sodium chloride in 1000 parts of water. After 45 minutes at 60° C., 20 parts of calcined soda are added. The temperature of the dye bath is kept for another 45 minutes at 60° C. The dyed fabric is then rinsed and dried in customary manner.

Dyeing Example 16

100 parts of a cotton fabric are placed in a dye bath at 30° C., which bath comprises 1.2 parts of the dye of formula (125), 1.2 parts of the dye of formula (110), 3.6 parts of the dye of formula

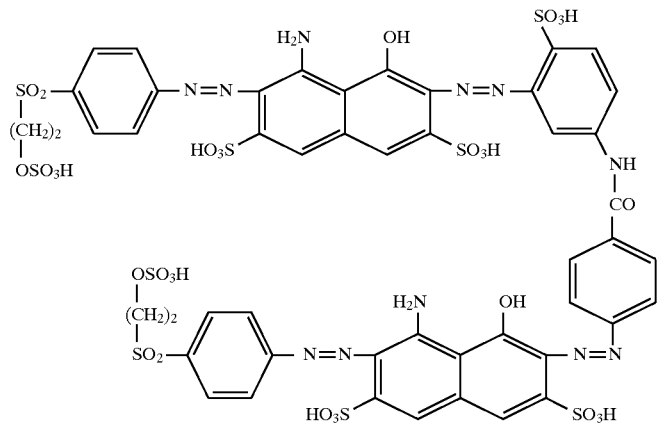

and 30 parts of sodium chloride in 1000 parts of water. The temperature of the dye bath is raised over 30 minutes to 90° C. and kept there for another 45 minutes. The temperature is lowered over about 15 minutes to 70° C. and 15 parts of calcined soda are then added and the temperature of the dye bath is kept for another 45 minutes at 70° C. The dyed fabric is then rinsed and dried in customary manner.

Dyeing Example 17

100 parts of a cotton fabric are placed in a dye bath at 30° C., which bath comprises 2.7 parts of the dye of formula (125), 0.9 part of the dye of formula (110), 2.4 parts of the dye of formula

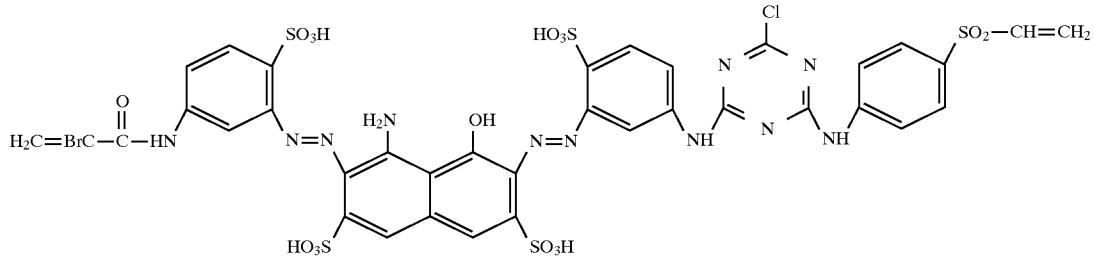

and 90 parts of sodium chloride in 1000 parts of water. The temperature of the dye bath is kept for 20 minutes and is then raised over about 40 minutes to 80° C. Subsequently, 20 parts of calcined soda are added and the temperature of the dye bath is kept for another 45 minutes at 80° C. The dyed fabric is then rinsed and dried in customary manner.

What is claimed is:

1. A dye mixture, which comprises at least one reactive dye of formula

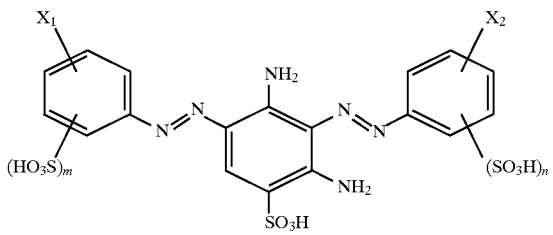

together with at least one reactive dye of formula

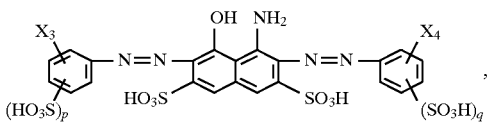

wherein m and n are each independently of the other the number 0, 1 or 2, p and q are each independently of the other the number 0 or 1, and $X_1$, $X_2$, $X_3$ and $X_4$ are each independently of one another a radical of formula —SO$_2$—CH$_2$—CH$_2$—U         (3a), —SO$_2$—CH=CH$_2$              (3b), —NH—CO—CH(Hal)—CH$_2$Hal       (3c) or —NH—CO—C(Hal)=CH$_2$           (3d), U is a leaving group, and Hal is halogen, with the proviso that the dye mixtures do not contain any substantial amount of a reactive dye of formula

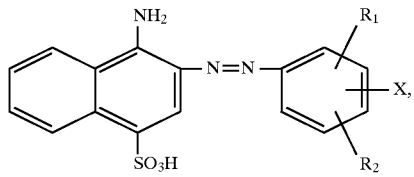

wherein $R_1$ and $R_2$ are hydrogen, methyl or methoxy, and X is a radical of the above formula (3a) or (3b), or, if the dye mixtures contain a reactive dye of formula

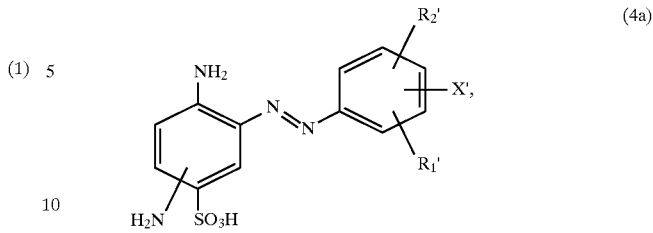

wherein $R_1'$ and $R_2'$ are hydrogen, methyl or methoxy and X' is a radical of the above formula (3a) or (3b), the weight ratio of the dye of formula (1) to the dye of formula (4a) is greater than 2:1.

2. A dye mixture according to claim 1, wherein Hal is chloro or bromo.

3. A dye mixture according to claim 1, wherein Hal is bromo.

4. A dye mixture according to claim 1, wherein U is —Cl, —Br, —F, —OSO$_3$H, —SSO$_3$H, —OCO—CH$_3$, —OPO$_3$H$_2$, —OCO—C$_6$H$_5$, —OSO$_2$—C$_1$—C$_4$alkyl or —OSO$_2$—N(C$_1$—C$_4$alkyl)$_2$.

5. A dye mixture according to claim 1, wherein U is —Cl or —OSO$_3$H.

6. A dye mixture according to claim 1, wherein $X_1$ and $X_2$ are each independently of the other a radical of formula (3a) or (3c).

7. A dye mixture according to claim 1, wherein $X_3$ and $X_4$ are each independently of the other a radical of formula (3a) or (3c).

8. A dye mixture according to claim 1, wherein $X_1$, $X_2$, $X_3$ and $X_4$ are a radical of formula (3a) or (3c), U is the radical —OSO$_3$H, and the sum of m and n is the number 0 or 1.

9. A dye mixture according to claim 1, which comprises at least one reactive dye of formulae (5), (6) and (7)

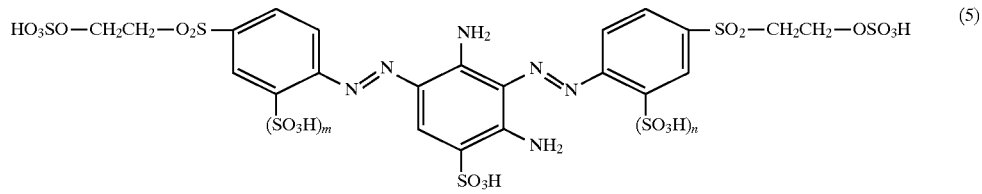

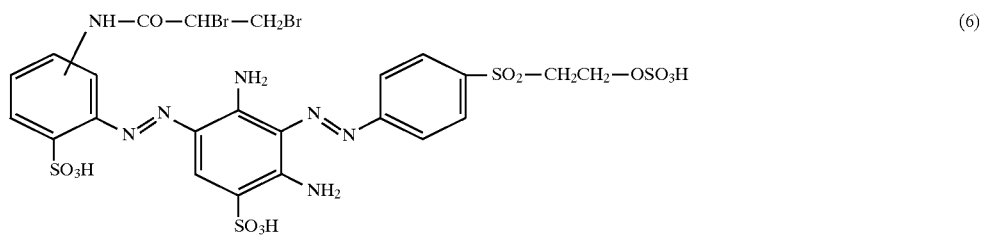

-continued

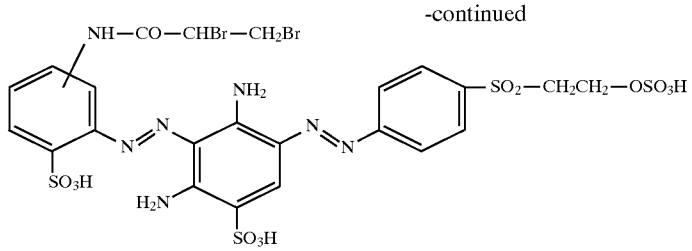
(7)

together with at least one reactive dye of formulae (8) and (9)

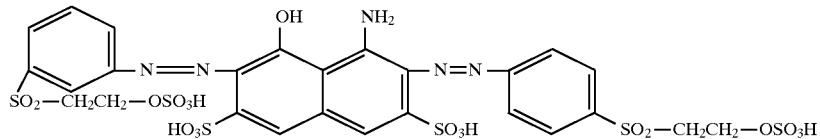
(8)

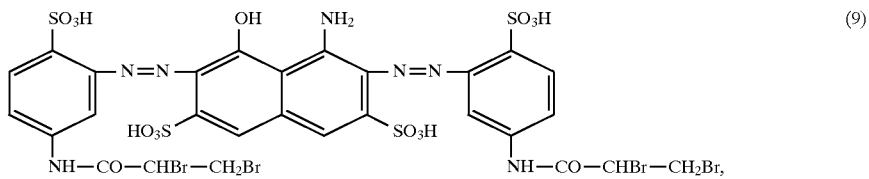
(9)

the sum of m and n being the number 0 or 1.

10. A dye mixture according to claim 9, which comprises a reactive dye of formula (5) together with a reactive dye of formula (8).

11. A dye mixture according to claim 1, which does not contain any substantial amount of a reactive dye of formula (4).

12. A dye mixture according to claim 1, wherein, if the dye mixture contains a reactive dye of formula (4a), the weight ratio of the dye of formula (1) to the dye of formula (4a) is greater than 4:1.

13. A process for dyeing or printing natural or synthetic polyamide fibre materials, which comprises using a dye mixture comprising at least one reactive dye of formula

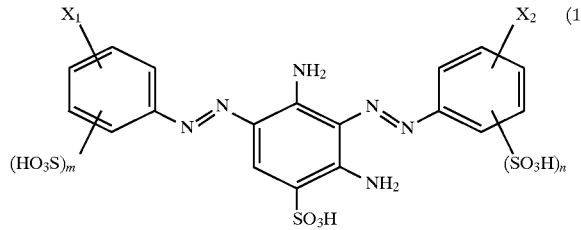
(1)

together with at least one reactive dye of formula

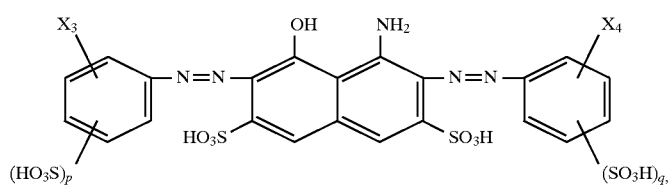
(2)

wherein m and n are each independently of the other the number 0, 1 or 2, p and q are each independently of the other the number 0 or 1, and $X_1$, $X_2$, $X_3$ and $X_4$ are each independently of one another a radical of formula $$-SO_2-CH_2-CH_2-U \quad (3a),$$

$$-SO_2-CH=CH_2 \quad (3b),$$

$$-NH-CO-CH(Hal)-CH_2Hal \quad (3c) \text{ or}$$

$$-NH-CO-C(Hal)=CH_2 \quad (3d),$$

U is a leaving group, and Hal is halogen.

14. A process for dyeing or printing hydroxyl group-containing or nitrogen-containing fibre material, which process comprises applying to said fibre material a tinctorially effective amount of a dye mixture according to claim 1.

15. A process according to claim 14, wherein said fibre material is cellulosic fibre material.

16. A reactive dye of formula
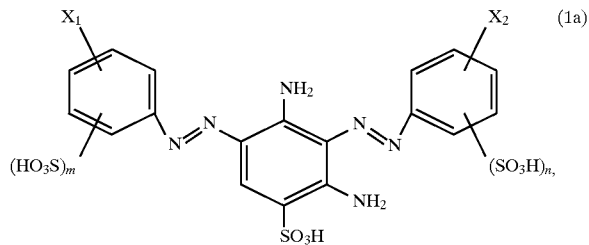
wherein
m and n are each independently of the other the number 0, 1 or 2, one of the radicals $X_1$ and $X_2$ is a radical of formula
—SO$_2$—CH$_2$—CH$_2$—U     (3a),
—SO$_2$—CH=CH$_2$     (3b),
—NH—CO—CH(Hal)—CH$_2$Hal     (3c) or
—NH—CO—C(Hal)=CH$_2$     (3d),
and the other one of the radicals $X_1$ and $X_2$ is a radical of formula (3c) or (3d), U is a leaving group, and Hal is halogen.
* * * * *